United States Patent [19]

Lan

[11] Patent Number: 5,016,188

[45] Date of Patent: May 14, 1991

[54] DISCRETE-TIME OPTIMAL CONTROL BY NEURAL NETWORK

[75] Inventor: Ming-Shong Lan, Thousand Oaks, Calif.

[73] Assignee: Rockwell International Corporation, El Segundo, Calif.

[21] Appl. No.: 416,163

[22] Filed: Oct. 2, 1989

[51] Int. Cl.$^5$ ............................................. G06F 15/46
[52] U.S. Cl. ..................................... 364/513; 364/172; 364/221.1; 364/221.3; 364/221.9; 364/274.9; 364/275.2; 364/276.6
[58] Field of Search ........................ 364/513, 200, 172; 307/201

[56] References Cited

U.S. PATENT DOCUMENTS 4,660,166 4/1987 Hopfield ............................. 364/807

OTHER PUBLICATIONS

Bartos, Frank J., "AI Now More Realistically AI Work in Industry", *Control Engineering*, Jul. 1989, pp. 90–93.
McCusker, Tom, "Nevral Networks and Fuzzy Logic, Tools of Promise for Controls", *Control Engineering*, May 1990, pp. 84–85.
Kwakernaak, et al., Linear Optimal Control Systems, pp. 216–220 (Wiley-Interscience 1972).
Tank, et al., Collective Computation in Neuronlike Circuits, Scientific American, pp. 104–114 (Dec. 1987).
Zienkiewicz, The Finite Element Method, pp. 83–87 (McGraw-Hill 1977).
Hopfield, et al., Computing with Neural Circuits: A Model, Science, vol. 233, pp. 625–633 (8 Aug. 1986).
Kohonen, Adaptive, Associative, and Self-Organizing Functions in Neural Computing, Applied Optics, vol 26, pp. 4910–4918 (1987).
Kohonen, An Introduction to Neural Computing, Neural Networks, vol. 1, pp. 3–16 (1988).

*Primary Examiner*—Allen R. MacDonald
*Assistant Examiner*—Roger S. Joyner
*Attorney, Agent, or Firm*—John J. Deinken

[57] ABSTRACT

A neural network determines optimal control inputs for a linear quadratic discrete-time process at M sampling times, the process being characterized by a quadratic cost function, p state variables, and r control variables. The network includes $N=(p+r)M$ neurons, a distinct neuron being assigned to represent the value of each state variable at each sampling time and a distinct neuron being assigned to represent the value of each control variable at each sampling time. An input bias connected to each neuron has a value determined by the quandratic cost function for the variable represented by the neuron. Selected connections are provided between the output of each neuron and the input of selected other neurons in the network, each such connection and the strength of each such connection being determined by the relationship in the cost function between the variable represented by the connected output neuron and the variable represented by the connected input neuron, such that running the neural network for a sufficient time to minimize the cost function will produce optimum values for each control variable at each sampling time.

7 Claims, 2 Drawing Sheets

DISCRETE-TIME OPTIMAL CONTROL BY NEURAL NETWORK

BACKGROUND OF THE INVENTION

This invention is concerned with the use of neural networks to determine optimal control parameters for linear quadratic discrete-time processes.

Optimal control problems are among the most difficult of optimization problems. This class of control problems typically includes equality constraints which are defined in terms of differential/difference equations and various boundary conditions, as well as inequality constraints which involve boundary conditions, entire trajectories, and controls. The implementation of an optimal control strategy for a linear quadratic problem has traditionally required a solution of the Riccati equation. The discrete-time Riccati equation has generally been solved by numerical computation, a recursive method, or an eigenvalue-eigenvector method (See, e.g., Kwakernaak, et al., Linear Optimal Control Systems, Pages 193-327 (Wiley-Interscience 1972)). None of these procedures, however, is straightforward. The recursive method, for example, starts with a boundary condition and solves the Riccati equation backwards. Consequently, in the prior art it has typically been necessary to obtain the solution for an optimal control problem off-line and store the solution in memory. In this approach, the stored information must then be recalled to implement the optimal control on-line. This procedure has the drawback of not being able to deal with the control of a time-varying system.

Because of this and similar limitations of the prior art techniques, it would be desirable to provide a technique which is fast enough to provide optimization of linear quadratic discrete-time controls in real-time.

SUMMARY OF THE INVENTION

This invention provides a technique for mapping an optimal control problem onto a neural network to enable the determination of optimal control parameters for the problem in real time. The neural network of this invention determines optimal control inputs for a linear quadratic discrete-time process at M sampling times, the process being characterized by a quadratic cost function, p state variables, and r control variables. The network includes $N=(p+r)M$ neurons, a distinct neuron being assigned to represent the value of each state variable at each sampling time and a distinct neuron being assigned to represent the value of each control variable at each sampling time. An input bias connected to each neuron has a value determined by the quadratic cost function for the variable represented by the neuron. Selected connections are provided between the output of each neuron and the input of selected other neurons in the network, each such connection and the strength of each such connection being determined by the relationship in the cost function between the variable represented by the connected output neuron and the variable represented by the connected input neuron, such that running the neural network for a sufficient time to minimize the cost function will produce optimum values for each control variable at each sampling time.

Each neuron may be represented by an analog amplifier in a Hopfield network, where the change with time of the state variables $s_i$ in the network is governed by the coupled nonlinear differential equations:

$$C_i \frac{ds_i}{dt} = -\frac{1}{R_i} s_i + \sum_{j=1}^{N} T_{ij} f(s_j) + I_i$$

where $C_i$ is the ith neuron's input capacitance; $R_i$ is the ith neuron's resistance, $T_{ij}$ is the connection strength between the ith and jth neurons, f(s) is a smooth, monotonically nondecreasing function, and $I_i$ is a bias current.

In addition, the quadratic cost function may be further defined as:

$$J = -\tfrac{1}{2} \sum_{k=0}^{M} [-x_k^T (Q + \lambda A^T A)x_k - u_k^T(R + \lambda B^T B)u_k -$$

$$x_{k+1}^T (\lambda I)x_{k+1} + x_{k+1}^T (\lambda A)x_k + x_k^T (\lambda A^T)x_{k+1} +$$

$$x_{k+1}^T (\lambda B)u_k + u_k^T (\lambda B^T)x_{k+1} - x_k^T (\lambda A^T B)u_k - u_k^T (\lambda B^T A)x_k$$

where A is a p x p state transition matrix, B is a p×r control distribution matrix, $x_k$ is a p×1 state vector, $u_k$ is an r×1 control vector at the sampling time instant k, Q and R are symmetric weighting matrices, M is the number of time steps, λ is a finite constraint strength, and I is the identity matrix.

DESCRIPTION OF THE INVENTION

Figure 1:
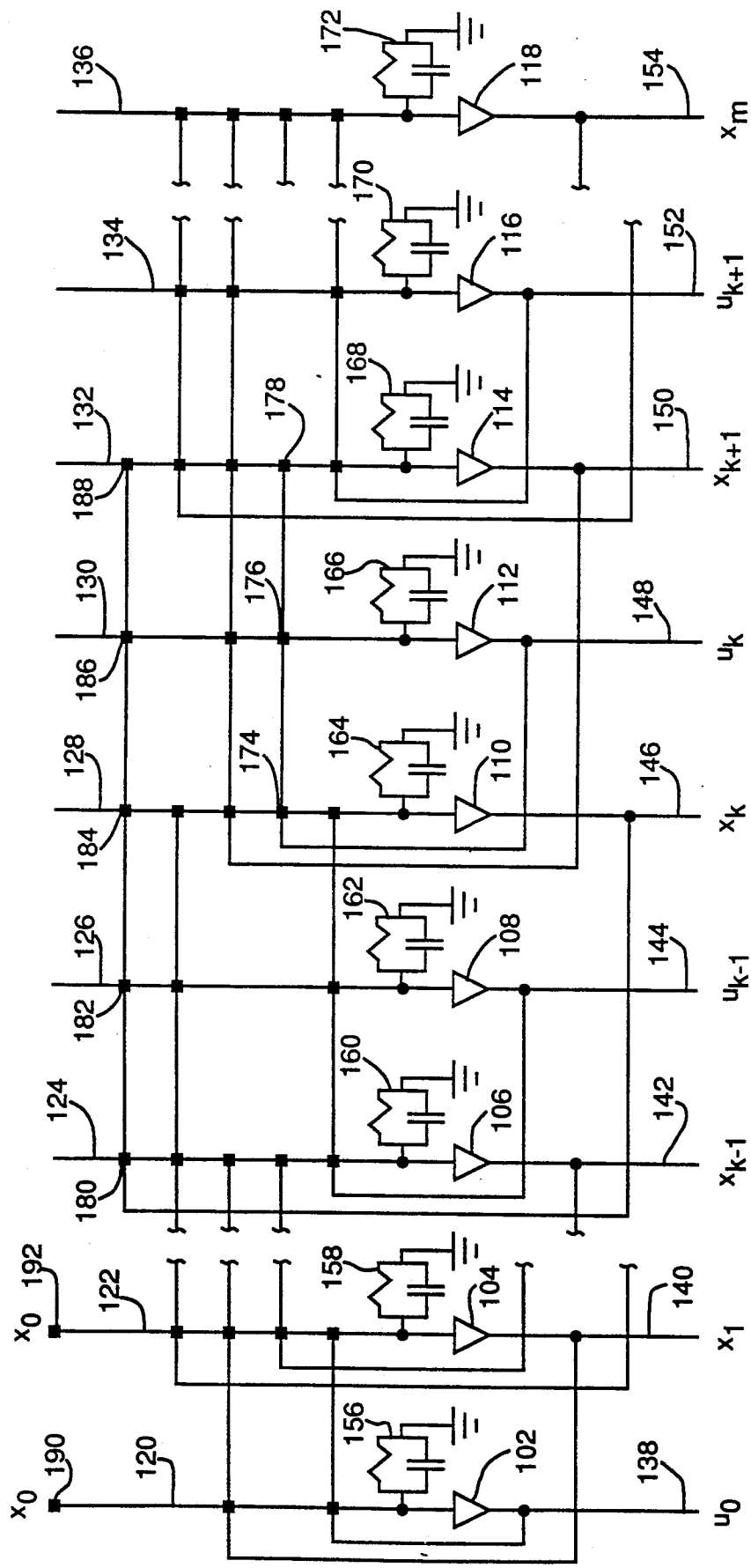
FIG. 1 is a a schematic drawing of an exemplary neural network constructed according to this invention.

It is an outstanding feature of this invention to solve a discrete-time optimal control problem by mapping the problem onto a Hopfield type of neural network. The Hopfield model is a desirable approach because of its simplicity and because of its proven success in providing useful solutions to many optimization problems.

A neural network is a parallel, interconnected network which is made up of of simple processing elements, known as neurons, and which is designed to operate in the same way as a biological nervous system. The function of the processing elements is to act as selective tuned filters for particular signal patterns. The complex operation of a neural network results from the inclusion of multiple feedback loops between various neurons which, together with the nonlinearities of the processing elements and adaptive changes in their parameters, enable the network to model complicated dynamic phenomena. One of the particular applications for neural networks is to solve optimization problems, a class of mathematical problems that involve finding the best solution from among a large number of possible choices. The objective in optimization is to allocate a limited amount of resources to a set of tasks such that some objective or cost function is minimized. Neural networks have been proposed as a model of computation for solving a wide variety of optimization problems, such as the traveling salesman problem, analog to digital conversion, signal decision, and linear programming.

In the Hopfield model of a neural network, the change with time of the state variables $s_i$ in a network of N neurons is governed by a set of coupled nonlinear differential equations:

$$C_i \frac{ds_i}{dt} = -\frac{1}{R_i} s_i + \sum_{j=1}^{N} T_{ij} f(s_j) + I_i \qquad (1)$$

where $C_i$ is the ith neuron's input capacitance; $R_i$ is the ith neuron's resistance, $T_{ij}$ is the connection strength between the ith and jth neurons, f(s) is a smooth, monotonically nondecreasing function, and $I_i$ is a bias current. In Equation (1), the net input current charging the input capacitance $C_i$ of neuron i to potential $s_i$ is expressed as the sum of postsynaptic currents induced in i by presynaptic activity in neuron j, leakage current due to the finite input resistance $R_i$ of neuron i, and input currents $I_i$ from other neurons external to the circuit. The time evolution of any hypothetical circuit, which is defined by specific values of $T_{ij}$, $I_i$, $f_i$, $C_i$, and $R_i$, can be simulated by the numerical integration of these equations. The Hopfield network models the neurons as analog amplifiers with linear or nonlinear transfer functions in conjunction with feedback circuits composed of wires, resistors, and capacitors connecting the neurons. The input impedance of a Hopfield neuron is represented by a resistor and a capacitor connected in parallel from the amplifier input to ground. These components define the time constants of the neurons and provide for the integrative analog summation of the synaptic input currents from other neurons in the network. The input currents for an amplifier are due to self feedback and feedback from other amplifiers in the circuit, along with an externally applied bias current $I_i$. The synaptic connection between neurons i and j includes a resistance $R_{ij}$, where $R_{ij}=1/T_{ij}$. The jth neuron in the network has an output voltage $V_j$ determined by the relation:

$$V_j = f(s_j) \qquad (2)$$

where f is a smooth, monotonically nondecreasing function.

To solve an optimization problem using a neural network, the cost function being optimized, which may also be considered as an energy function for the system, must be mapped onto the network. A typical energy function E for the Hopfield type of network is given by:

$$E = -\frac{1}{2} \sum_{i=1}^{N} \sum_{j=1}^{N} T_{ij} V_i V_j - \sum_{i=1}^{N} V_i I_i \qquad (3)$$

where $V_i$ represents the output of the N neurons, which are the basic processors in the neural network, and $I_i$ represents the input bias current to the ith neuron.

In order to design a proper network architecture and choose the appropriate strengths for the connections and input biases, the linear quadratic discrete-time optimal control problem is formulated by assuming a multiple-input and multiple-output discrete-time system represented by:

$$x_{k+1} = A x_k + B u_k \qquad (4)$$

where A is a p×p state transition matrix and B is a p×r control distribution matrix; $x_k$ is a p×1 state vector and $u_k$ is an r×1 control vector at the sampling time instant k. The goal is to find $u_k$ such that a quadratic cost function (or performance index) J is minimized, where:

$$J = \frac{1}{2} \sum_{k=0}^{M} [x_k^T Q x_k + u_k^T R u_k] \qquad (5)$$

In Equation (5), non-negative Q and R are symmetric weighting matrices to be selected based upon the relative importance of the various state variables and control variables, while M is the number of time steps. This problem can be restated as minimizing the cost function J subject to the constraint that:

$$x_{k+1} - A x_k - B u_k = 0 \quad k=0,1,\ldots M \qquad (6)$$

This is a standard constrained-minimization problem which can be solved by the Penalty Method (See, e.g., Zienkiewicz, The Finite Element Method, Pages 83–87 (McGraw-Hill 1977)). This constrained optimization problem can be converted into an unconstrained optimization problem with minimization of the modified cost function J':

$$J' = \frac{1}{2} \sum_{k=0}^{M} [x_k^T Q x_k + u_k^T R u_k + \lambda ||x_{k+1} - A x_k - B u_k||^2] \qquad (7)$$

which expands to:

$$J' = -\frac{1}{2} \sum_{k=0}^{M} [-x_k^T (Q + \lambda A^T A) x_k - u_k^T (R + \lambda B^T B) u_k - \\ x_{k+1}^T (\lambda I) x_{k+1} + x_{k+1}^T (\lambda A) x_k + x_k^T (\lambda A^T) x_{k+1} + \\ x_{k+1}^T (\lambda B) u_k + u_k^T (\lambda B^T) x_{k+1} - x_k^T (\lambda A^T B) u_k - u_k^T (\lambda B^T A) x_k \qquad (8)$$

where $\lambda$ is a finite constraint strength and I is the identity matrix. In principle, the larger the $\lambda$ the better the convergence. The conventional approaches in the prior art require further derivation of the Riccati equation. In the present invention, by contrast, the modified cost function J', which is considered as the energy function of the network, can be directly mapped onto an appropriate neural network architecture with the terms in Equation 8) providing the weighting strengths for the connections between neurons.

An exemplary neural network constructed according to this invention is illustrated in FIG. 1 in schematic form. For the purpose of effectively illustrating the neural network architecture of this invention, only a single state variable and a single control variable are depicted in the network of FIG. 1. Furthermore, only a portion of the 2M neurons in the network is illustrated. In FIG. 1, amplifier neurons 102, 108, 112, and 116 represent the control function u at discrete times 0, k−1, k, and k+1, respectively. Neurons 102, 108, 112, and 116 are provided with respective input lines 120, 126, 130, and 134, as well as output lines 138, 144, 148, and 152. Neurons 104, 106, 110, 114, and 118 represent the state function x at discrete times 1, k−1, k, k+1, and M. Neurons 104, 106, 110, 114, and 118 are provided with respective input lines 122, 124, 128, 132, and 136, as well as output lines 140, 142, 146, 150, and 154. The input impedance for each neuron 102–118 is provided by a respective RC network 156–172, connected to ground. Whether a given pair of neurons are connected, as well as the strength of the connection, is determined by the components of the matrices (such as, for example, $Q+\lambda A^T A$ and $\lambda A^T B$) in Equation (8). Thus, for example, the output 148 of the $u_k$th neuron 112 is connected by synaptic connections (indicated by the darkened squares) 174, 176, and 178 to the inputs of the $x_k$, $u_k$, and $x_{k+1}$ neurons 110, 112, and 114. Similarly, the output 146 of the $x_k$th neuron 110 is connected by synaptic connections 180, 182, 184, 186, and 188 to the inputs of the $x_{k-1}$, $u_{k-1}$, $x_k$, $u_k$, and $x_{k+1}$ neurons 106, 108, 110, 112, and 114. The initial state of the system $x_0$ is input to the $u_0$ and $x_1$ neurons 102 and 104 through synaptic connections 190 and 192. Hopfield has shown that with symmetric connections (i.e., $T_{ij}=T_{ji}$) a local minimum of the energy function E reaches a stable state. Therefore, optimal trajectories and control inputs can be obtained as the network converges or reaches a stable state.

As those skilled in the art will appreciate, the network depicted in FIG. 1 can be easily expanded to solve optimal control problems for multiple-input and multiple-output dynamical systems. For a system with p state variables and r control variables, $M(p+r)$ neurons would be required. The network can be arranged as a two dimensional network having 2M columns and p (if $p \geq r$) or r (if $r \geq p$) rows. Neurons are locally connected among those representing the state and control variables at the sampling time instants k and k+1. Information as to which neurons are to be connected, as well as the connection strengths between any two neurons, can be obtained from Equation (8). As shown in FIG. 1, the initial states $x_0$ of the system are external inputs to the neurons representing $u_0$ (the control variables at time $k=0$) and to the neurons representing $x_1$ (the state variables at time $k=1$).

Figure 2:
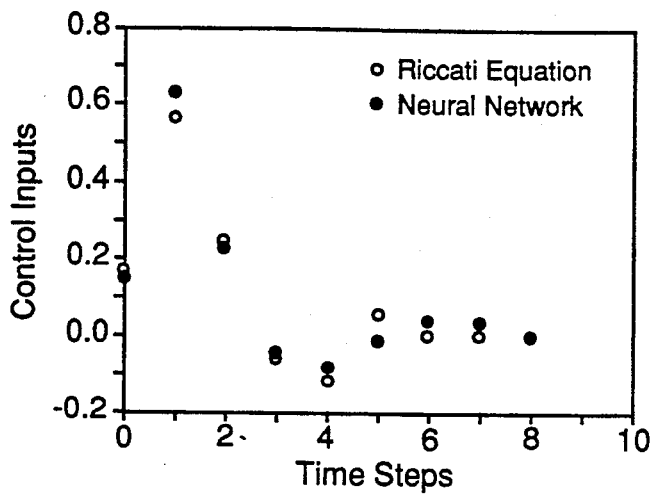
FIG. 2 is a plot of the optimal control inputs on the vertical axis versus the discrete time steps plotted on the horizontal axis, for a computer simulation using the neural network of this invention to solve an optimal regulation problem for a discrete-time one-input two-output system.
Figure 3:
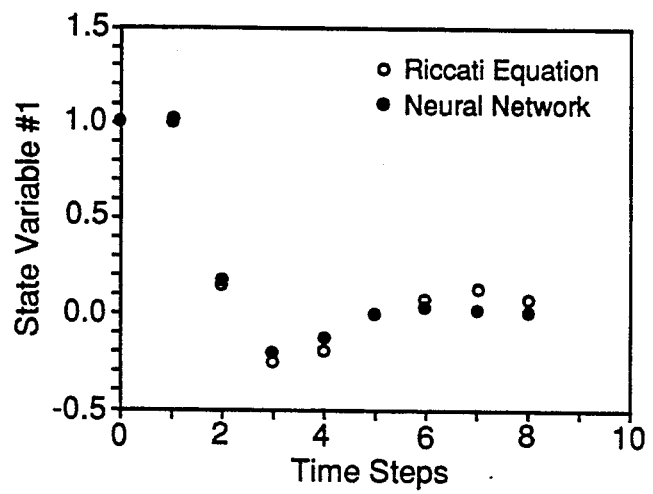
FIG. 3 is a plot similar to FIG. 2, but with the optimal trajectory of the first state variable plotted on the vertical axis.
Figure 4:
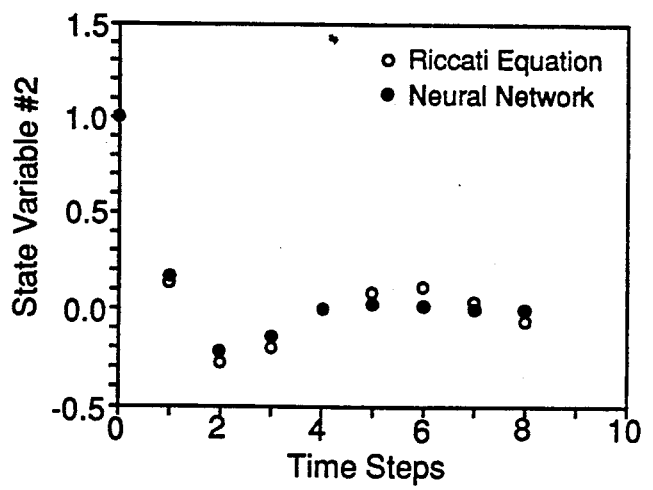
FIG. 4 is a plot similar to FIG. 3, but depicting the optimal trajectory for the second state variable.

Computer simulation of the neural network of this invention has been used to solve an optimal regulation problem for a discrete-time one-input two-output system. Initial values for both of the state variables were set to 1, while 9 discrete-time steps were used. In addition, the function f(s) used was an unbounded, linear function. Those skilled in the art will appreciate that applications to practical control problems will require a bounded function, which can readily be applied in this invention. The results of this simulation are graphically depicted in FIGS. 2-4. FIG. 2 is a plot of the optimal control inputs on the vertical axis versus the discrete time steps plotted on the horizontal axis. FIG. 3 is a similar plot, but with the optimal trajectory of the first state variable plotted on the vertical axis, while FIG. 4 is a plot similar to FIG. 3, but depicting the optimal trajectory for the second state variable. As can be observed from these plots, the results obtained with this invention closely match those obtained by solving the discrete Riccati equation, the latter solutions being plotted for comparison purposes in FIGS. 2-4.

There are several advantages to using the approach of this invention for the solution of an optimal control problem. First, the optimization function of an optimal control problem can be directly mapped onto a neural network. Second, the entire solution, i.e., control inputs and optimal trajectories, can be obtained simultaneously within a few time constants of the network. These advantages have been illustrated through the description above of a preferred embodiment of the invention. Modifications and additional embodiments, however, will undoubtedly be apparent to those skilled in the art. Although, for example, the invention has been described in conjunction with a linear quadratic discrete-time optimal control problem, the same approach can also be used to solve linear quadratic Gaussian optimal control problems. In the latter application, Gaussian white noise can be introduced as external inputs to the neurons. Furthermore, equivalent elements may be substituted for those illustrated and described herein, parts or connections might be reversed or otherwise interchanged, and certain features of the invention may be utilized independently of other features. Consequently, the exemplary embodiment should be considered illustrative, rather than inclusive, while the appended claims are more indicative of the full scope of the invention.

The teaching of the following documents, which are referred to herein, is incorporated by reference: Kwakernaak, et al., Linear Optimal Control Systems, Pages 193–327 (Wiley-Interscience 1972); Zienkiewicz, The Finite Element Method, Pages 83–87 (McGraw-Hill 1977).

I claim:

1. A neural network for determining according to a quadratic cost function optimal control inputs for a linear discrete-time process at M sampling times, the process being characterized by and r control variables, comprising:

N=(p+r) M neurons, a distinct neuron being assigned to represent the value of each state variable at each sampling time and a distinct neuron being assigned to represent the value of each control variable at each sampling time;

an input for each neuron;

an output for each neuron;

an external input connected to the neurons representing the initial values of each state variable and each control variable, the external input having a value determined by a modified quadratic cost function J' defined as:

$$J = -\tfrac{1}{2} \sum_{k=0}^{M} -x_k^T(Q + \lambda A^T A)x_k - u_k^T(R + \lambda B^T B)u_k -$$

$$x_{k+1}^T(\lambda I)x_{k+1} + x_{k+1}^T(\lambda A)x_k + x_k^T(\lambda A^T)x_{k+1} + x_{k+1}(\lambda B)u_k +$$

$$u_k^T(\lambda B^T)x_{k+1} - x_k^T(\lambda A^T B)u_k - u_k^T(\lambda B^T A)x_k$$

where A is a p×p state transition matrix, B is a p×r control distribution matrix, $X_k$ is a p×1 state vector, $u_k$ is an r×1 control vector at the sampling time instant k, Q and R are symmetric weighting matrices, M is the number of time steps, $\lambda$ is a finite constraint strength, and I is the identity matrix; and a connection between the output of each neuron and the input of each other neuron in the network, the strength of each such connection being determined by the modified cost function, such that running the neural network for a sufficient time to minimize the cost function will produce optimum values for each control variable at each sampling time.

2. The network of claim 1, wherein each neuron further comprises an analog amplifier.

3. The network of claim 2, wherein the network further comprises a Hopfield network, where the change with time of the state variables $s_i$ in the network is governed by the coupled nonlinear differential equations:

$$C_i \frac{ds_i}{dt} = -\frac{1}{R_i} s_i + \sum_{j=1}^{N} T_{ij} f(s_j) + I_i$$

where $C_i$ is the ith neuron's input capacitance; $R_i$ is the ith neuron's resistance, $T_{ij}$ is the connection strength between the ith and jth neurons, f(s) is a smooth, monotonically nondecreasing function, and $I_i$ is a bias current.

4. A Hopfield neural network for determining according to a quadratic cost function optimal control inputs for a linear discrete-time process at M sampling times, the process being characterized by p state variables and r control variables, where the change with time of the state variables $s_i$ in the network is governed by the coupled nonlinear differential equations:

$$C_i \frac{ds_i}{dt} = -\frac{1}{R_i} s_i + \sum_{j=1}^{N} T_{ij} f(s_j) + I_i$$

where $C_i$ is the ith neuron's input capacitance; $R_i$ is the ith neuron's resistance, $T_{ij}$ is the connection strength between the ith and jth neurons, f(s) is a smooth, monotonically nondecreasing function, and $I_i$ is a bias current, comprising:

N=(p+r) M neurons, each neuron comprising an analog amplifier, a distinct neuron being assigned to represent the value of each state variable at each sampling time and a distinct neuron being assigned to represent the value of each control variable at each sampling time;

an input for each neuron;

an output for each neuron;

an external input connected to the neurons representing the initial values of each state variable and each control variable, the external input having a value determined by a modified quadratic cost function J':

$$J' = -\tfrac{1}{2} \sum_{k=0}^{M} -x_k^T(Q + \lambda A^T A)x_k - u_k^T(R + \lambda B^T B)u_k -$$

$$x_{k+1}^T(\lambda I)x_{k+1} + x_{k+1}^T(\lambda A)x_k + x_k^T(\lambda A^T)x_{k+1} + x_{k+1}(\lambda B)u_k +$$

$$u_k^T(\lambda B^T)x_{k+1} - x_k^T(\lambda A^T B)u_k - u_k^T(\lambda B^T A)x_k$$

where R is a p×p state transition matrix, B is a p×r control distribution matrix, $x_k$ is a p×1 state vector, $u_k$ is an r×1 control vector at the sampling time instant k, Q and R are symmetric weighting matrices, M is the number of time steps, $\lambda$ is a finite constraint strength, and I is the identity matrix; and a connection between the output of each neuron and the input of each other neuron in the network, the strength of each such connection being determined by the modified cost function, such that running the neural network for a sufficient time to minimize the cost function will produce optimum values for each control variable at each sampling time.

5. A method of determining according to a quadratic cost function optimal control inputs for a linear discrete-time process at M sampling times, the process being characterized by p state variables and r control variables, comprising providing a neural network having N=(p+r) M neurons;

assigning a distinct neuron to represent the value of each state variable at each sampling time;

assigning a distinct neuron to represent the value of each control variable at each sampling time;

providing an input for each neuron;

providing an output for each neuron;

connecting the neurons representing the initial values of each state variable and each control variable to an external input having a value determined by a modified quadratic cost function J' defined as:

$$J' = -\tfrac{1}{2} \sum_{k=0}^{M} -x_k^T(Q + \lambda A^T A)x_k - u_k^T(R + \lambda B^T B)u_k -$$

$$x_{k+1}^T(\lambda I)x_{k+1} + x_{k+1}^T(\lambda A)x_k + x_k^T(\lambda A^T)x_{k+1} + x_{k+1}(\lambda B)u_k +$$

$$u_k^T(\lambda B^T)x_{k+1} - x_k^T(\lambda A^T B)u_k - u_k^T(\lambda B^T A)x_k$$

where A is a p×p state transition matrix, B is a p×r control distribution matrix, $x_k$ is a p×1 state vector, $u_k$ is an r×1 control vector at the sampling time instant k, Q and R are symmetric weighting matrices, M is the number of time steps, $\lambda$ is a finite constraint strength, and I is the identity matrix;

connecting the output of each neuron to the input of each other neuron in the network, the strength of each such connection being determined by the modified cost function; and running the neural network for a sufficient time to minimize the cost function, thereby producing optimum values for each control variable at each sampling time.

6. The method of claim 5, wherein each neuron further comprises an analog amplifier.

7. The method of claim 6, wherein the network further comprises a Hopfield network, where the change with time of the state variables $s_i$ in the network is governed by the coupled nonlinear differential equations:

$$C_i \frac{ds_i}{dt} = -\frac{1}{R_i} s_i + \sum_{j=1}^{N} T_{ij} f(s_j) + I_i$$

where $C_i$ is the ith neuron's input capacitance; $R_i$ is the ith neuron's resistance, $T_{ij}$ is the connection strength between the ith and jth neurons, f(s) is a smooth, monotonically nondecreasing function, and $I_i$ is a bias current.

* * * * *